United States Patent [19]

Alexander

[11] Patent Number: 4,735,036
[45] Date of Patent: Apr. 5, 1988

[54] KNIFE DRIVE CENTRIFUGAL PENDULUM VIBRATION ABSORBER

[75] Inventor: James C. Alexander, Brantford, Canada

[73] Assignee: Massey Combines Corporation, Brantford, Canada

[21] Appl. No.: 55,270

[22] Filed: May 29, 1987

[51] Int. Cl.⁴ .................... A01D 34/30; A01D 75/18
[52] U.S. Cl. ........................................ 56/12.6; 56/306
[58] Field of Search .................... 56/6, 12.6, 306

[56] References Cited

U.S. PATENT DOCUMENTS

| | | | |
|---|---|---|---|
| 2,815,632 | 12/1957 | Dort | 56/306 |
| 2,922,268 | 1/1960 | Prichard | 56/306 |
| 3,104,511 | 9/1963 | Clark | 56/306 |
| 3,401,511 | 9/1968 | Weakly et al. | 56/12.6 |
| 3,796,104 | 3/1979 | Templeton | 56/306 |
| 4,342,187 | 8/1982 | Shupert | 56/306 |
| 4,402,174 | 9/1983 | Boone | 56/306 |

FOREIGN PATENT DOCUMENTS 545646  6/1942  United Kingdom .................. 56/306

*Primary Examiner*—Paul J. Hirsch
*Attorney, Agent, or Firm*—Robert L. Farris

[57] ABSTRACT

A knife drive centrifugal pendulum vibration absorber for an agricultural combine harvester includes a wobble drive assembly 82 with an input drive shaft 132. A flywheel 188 is secured to the wobble drive input drive shaft 132. The flywheel has apertures 192 with walls that are arcs about an axis that are parallel to the axis of rotation of the flywheel 188. A roller 194 is inserted in each aperture 194. The rollers 194 roll along the walls of the apertures 194 in response to changes in the speed of rotation of the flywheel 188 and absorb vibrations induced in the drive shaft 132 by a reciprocating knife assembly 74.

7 Claims, 3 Drawing Sheets

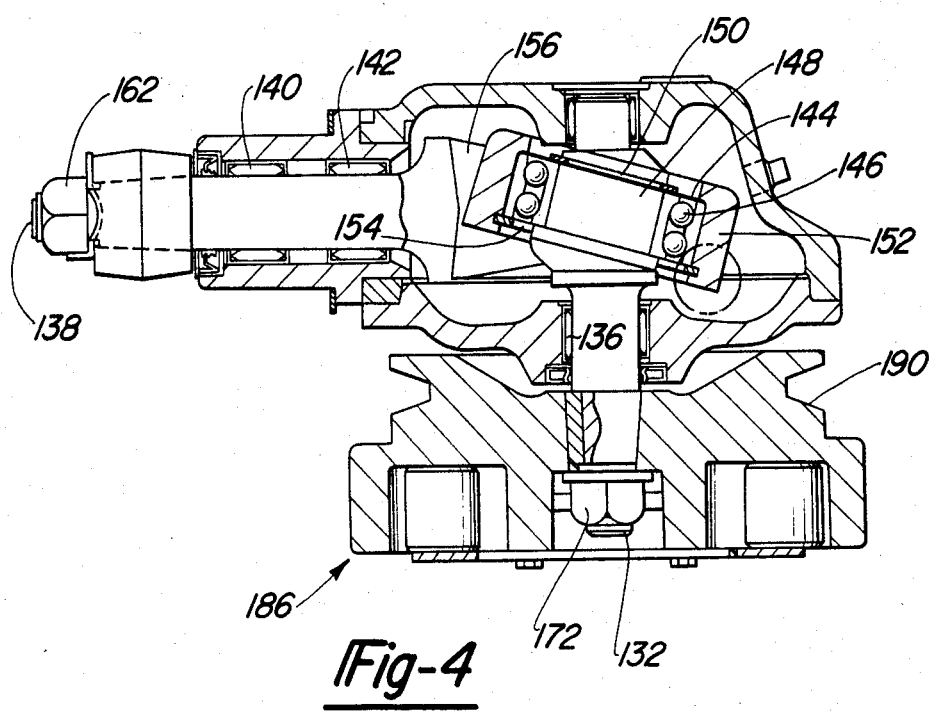
*Fig-4*
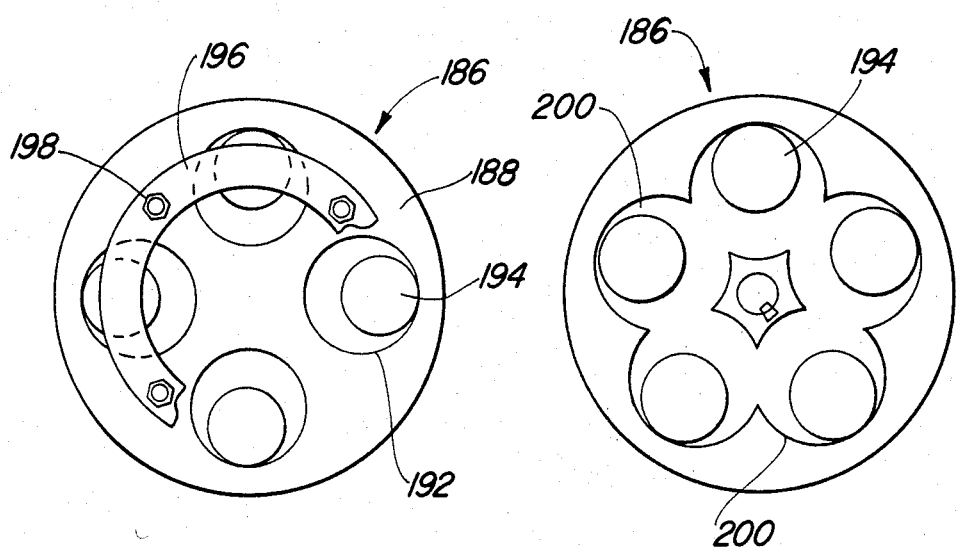
*Fig-5*  *Fig-6*

KNIFE DRIVE CENTRIFUGAL PENDULUM VIBRATION ABSORBER

TECHNICAL FIELD

This invention relates to a drive for a reciprocating knife on an agricultural harvester for severing crop material from the ground. More specifically the invention relates to a vibration absorber for absorbing torsional vibrations induced in a wobble knife drive by a reciprocating knife or sickle.

BACKGROUND ART

Wobble knife drives have been used on agricultural harvesters for a number of years. Many manufacturers use them on combine harvesters. As the capacity of combine harvesters has increased over the years, the width of swath harvested has increased. Today it is common to find harvester headers which sever a swath of crop material thirty feet wide during each pass through a field.

The force required to reciprocate a knife cutting a thirty foot swath of crop material can be large. This is especially true in crops with a tough or hard stalk, and in crops that are growing with weeds. The vibrations induced in a knife drive on a large header when cutting a tough crop can cause drive failures.

A reciprocating knife driven by a wobble knife drive with a modified centrifugal pendulum vibration absorber is currently available on combine harvesters. This vibration absorber is substantially identical to bifilar-type centrifugal pendulum vibration absorbers used on some diesel engine crankshafts and shown in engineering books on vibration theory.

The bifilar-type centrifugal vibration absorbers work well on harvester knife drives. They absorb vibration and reduce wear and failures in the knife drive. However, there are problems. The vibration absorbers have a number of parts subject to wear. The overall width of a header with a bifilar-type centrifugal vibration absorber is increased. During an overload of the commercially available vibration absorber, the U-shaped weights strike the support disk or plate making objectionable noise and occasionally damaging the machine.

DISCLOSURE OF THE INVENTION

The objectives of the invention include a reduction in the number of parts subject to wear, reduction in the width of the drive, and elimination or at least reduction of damage due to severe knife loading.

These objectives are met by providing a flywheel that is rigidly secured to a knife wobble drive input shaft. The flywheel has at least one aperture with an arcuate wall. A roller member is inserted into the aperture so that it is free to roll along the arcuate surface in response to changes in the rotational speed of the wobble drive input shaft and centrifugal force. A retainer member is provided to hold the roller member in the aperture.

Preferably there are a number of arcuate surfaces with a roller member to roll along each of the surfaces. Since the total width of the vibration absorber can be the length of the rollers plus the thickness of the roller retainer, the width can be adjusted to meet the requirements of the installation. By combining the flywheel with the input drive pulley, the width of the wobble drive together with the input drive pulley and the centrifugal pendulum vibration absorber can be reduced further Severe knife loading can result in the wobble drive input shaft coming to an abrupt stop. This will result in the roller members losing contact with their arcuate surfaces and falling due to the force of gravity. The chance of significant damage, resulting from a roller member falling a short distance within an aperture in a flywheel, is nonexistant. If there is too much wear, it can be corrected by inserting larger rollers; an easy and relatively inexpensive task.

DESCRIPTION OF THE DRAWING

FIG. 4 is a sectional view of a wobble drive with the centrifugal pendulum vibration absorber of this invention;

FIG. 5 is a side elevation to a reduced scale of the centrifugal pendulum vibration absorber shown in FIG. 4, with a portion of the roller retainer broken away; and, FIG. 6 is a side elevation of a modified form of the centrifugal pendulum vibration absorber shown in FIG. 5 with the roller retainer removed.

BEST MODE FOR CARRYING OUT THE INVENTION

Figure 1:
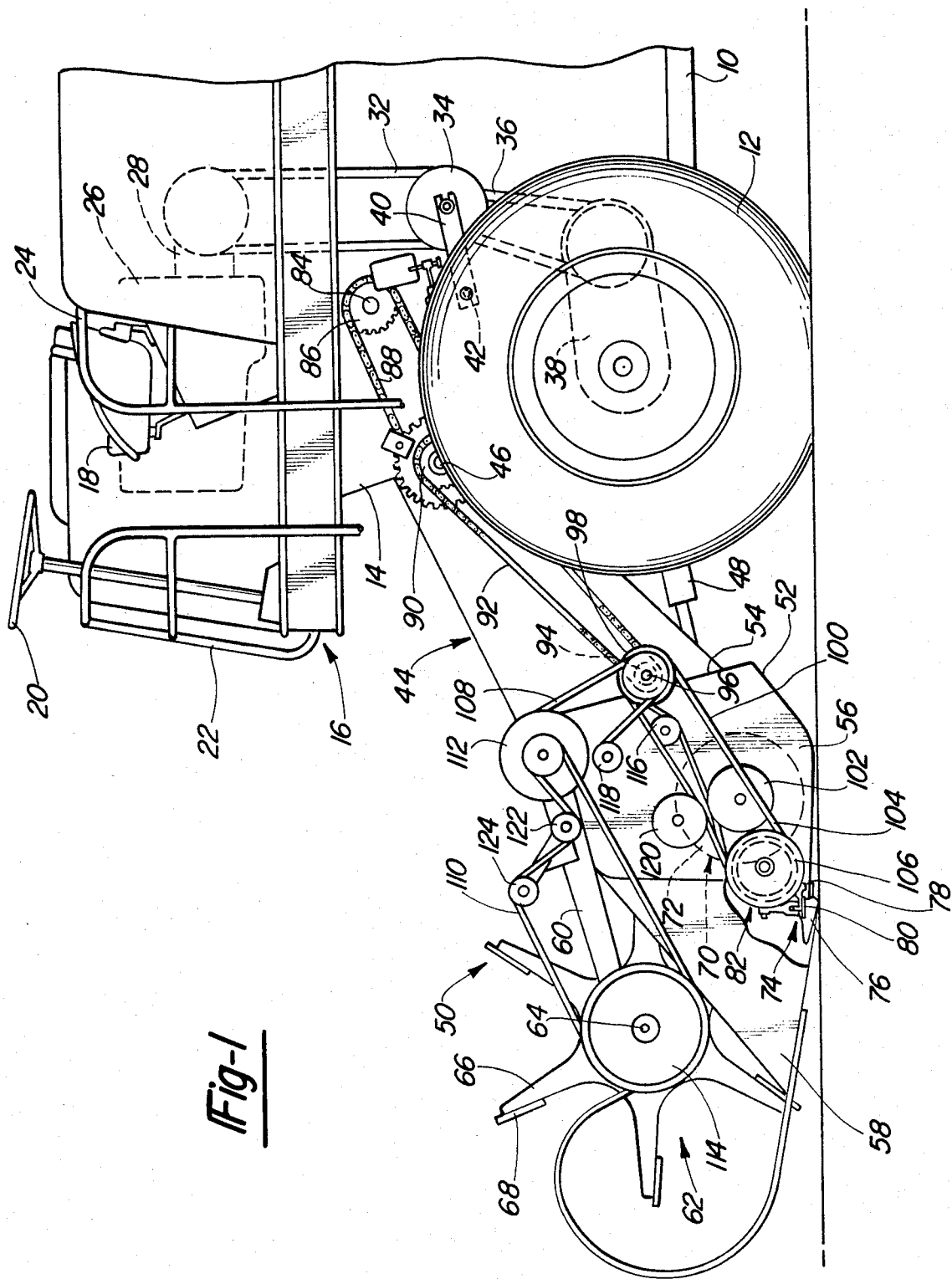
FIG. 1 is a side elevation of a portion of a combine harvester, employing the knife drive centrifugal pendulum vibration absorber of this invention, with parts broken away.

The combine harvester 8, a portion of which is shown in FIG. 1, has a frame 10 supported on a pair of front driven wheels 12. The rear portion of the frame 10 is supported by steered wheels that are not shown. A separator housing 14 mounted on the frame houses crop material threshing, separating and cleaning assemblies.

The operator's platform 16 is mounted on the upper left-hand side of the frame 10. The operator's platform includes an operator's seat 18. A steering wheel 20 and other required controls (not shown) are provided to allow the operator to control the combine harvester 8. Guard rails 22 and 24 are provided to keep the operator from falling from the operator's platform 16.

An internal combustion engine 26 is mounted in the engine compartment behind or to the right of the operator's platform, as shown in FIG. 1. The internal combustion engine 26 drives the front driven wheels 12 through a gear train in box 28, a shive 30, a belt 32, a variable speed shive assembly 34, a belt 36 and a gear train in a transmission 38. The variable speed shive assembly 34 is mounted on arms 40 which are pivotally supported on the frame 10 by a shaft 42.

An elevator assembly 44 is pivotally attached to the forward portion of the separator housing 14 for pivotal movement about the axis of the upper elevator conveyor shaft 46. One or more hydraulic cylinders 48 are connected to the frame 10 and the front lower portion of the elevator assembly 44. The hydraulic cylinders 48 pivot the elevator assembly 44 about the axis of the upper elevator conveyor shaft 46 to raise and lower the front end of the elevator housing assembly 44.

A header assembly 50 is secured to the front of the elevator assembly 44. The header assembly 50 includes an auger trough 52, a rear wall 54 and a pair of end walls 56. A divider assembly 58 is attached to each of the end walls 56.

A reel support arm 60 is secured to each end wall 56 of the header assembly 50. A reel 62 has a reel shaft 64, each end of which is rotatably journaled on a reel support arm 60. A plurality of reel bat arms 66 are rigidly secured to the reel shaft 64. Reel bats 68 are attached to the free ends of the reel bat arms 66.

An auger assembly 70 is rotatably journaled on each end wall 56 of the header assembly 50. The auger assembly 70 includes a central tube (not shown) and helical flighting 72.

A knife assembly 74 is secured to the forward edge of the auger trough 52. The knife assembly 74 includes a plurality of stationary knife guards 76 and a knife guard support bar 78 integral with the forward edge of the auger trough 52 and running the width of the header assembly 50. The knife guards 76 and the knife guard support bar 78 form a knife support which supports a knife assembly 80. The knife assembly 80 is free to reciprocate back and forth and cooperates with the knife guards 76 to sever crop material. A wobble drive assembly 82 is secured to an end wall 56 of the header assembly 50 and to the knife assembly 74.

The drives for the combine harvester 8 include a rear beater shaft 84 driven by the internal combustion engine 26 through a power tranmission means that is not shown. The rear beater shaft 84 drives a sprocket 86 which transmits torque through a chain 88 and a driven sprocket (not shown) to the upper elevator conveyor shaft 46. A drive sprocket 90, a chain 92 and driven sprocket 94 transmit torque from the upper elevator sprocket to the header drive shaft 96.

The header drive shaft 96 transmits torque and drives all the driven elements of the header assembly 50. The auger assembly 70 is driven by the header drive shaft 96 through a pulley assembly 98, a belt 100 and a pulley 102. The wobble drive assembly 82 is driven by a belt 104 trained around a pulley assembly 98, and the input drive pulley 106 on the wobble drive assembly 82. The reel 62 is driven by the header drive shaft 96 through belts 108 and 110 trained around the pulley assembly 98, the pulley assembly 112 and the reel drive pulley 114. Idler pulleys 116, 118, 120, 122 and 124 are adjustably mounted on the header assembly 50 to control the tension in belts 100, 104, 108 and 110.

Figure 2:
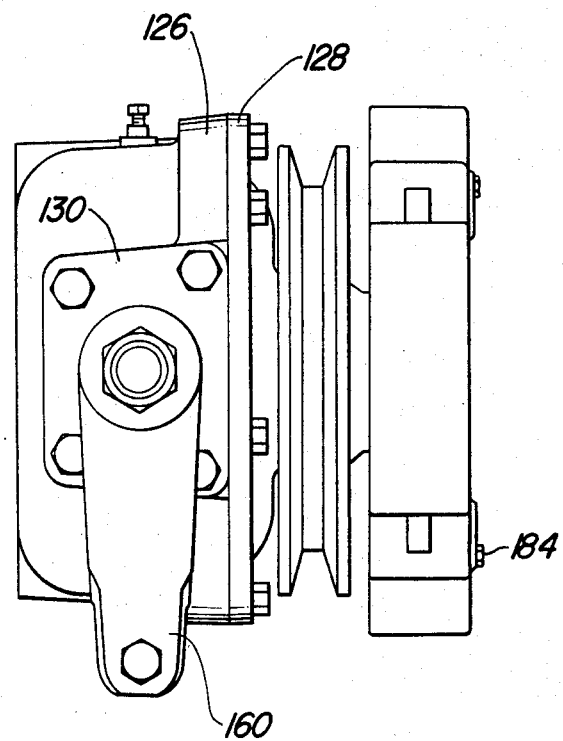
FIG. 2 is an enlarged front view of a wobble drive and an attached prior art centrifugal pendulum vibration absorber.
Figure 3:
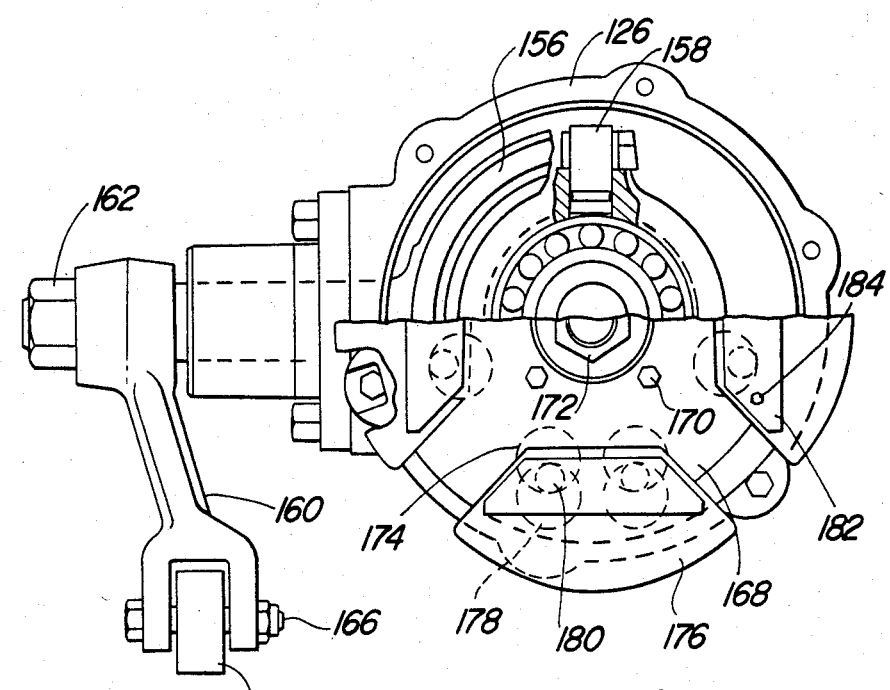
FIG. 3 is a side elevation of the prior art unit of FIG. 2 with parts broken away to show the inside of the wobble drive housing.

The wobble drive assembly 82, as shown in FIGS. 2, 3 and 4, includes a housing 126, an input shaft cover 128 and an output shaft cover 130. The input drive shaft, 132 is rotatably journaled in a bearing 134 in the housing 126 and a bearing 136 in the input shaft cover 128. The oscillating output shaft 138 is journaled in bearings 140 and 142 in the output shaft cover 130.

A bearing 144 with two rows of balls 146 is secured to a cylindrical portion 148 of the input drive shaft 132 by a lock ring 150. An oscilating bearing cage 152 is secured to the bearing 144 by a lock ring 154. The axis of the cylindrical portion 148 of the input drive shaft 132 is skewed relative to the axis of rotation of the input drive shaft 132. This results in oscilation of the oscilating bearing cage 152 when the input drive shaft 132 is rotated.

The oscillating output shaft 138 has two integral arms 156 on the end inside the housing 126. The integral arms 156 partially surround the oscilating bearing cage 152. A pin 158 connects each integral arm 156 to the oscilating bearing cage 152. The pins 158 have a common axis which intersects the axis of rotation of the input drive shaft 132.

A knife drive arm 160 is rigidly secured to an end of the oscillating output shaft 138 by a nut 162. The end of the knife drive arm 160 remote from the oscillating output shaft 138 is connected to a knife head 164 by a bolt 166. The knife head 164 is an integral part of the knife assembly 80. Normally the knife head 164 includes a bearing which allows pivotal movement between the knife drive arm 160 and the knife assembly 80.

The reciprocating knife assembly 80 induces vibrations in the knife drive train. With headers that cut a swath of crop material less than eighteen feet wide, the vibrations are not a serious problem. The wobble drive and the portions of the drive between the engine and the wobble drive are over designed to the point that failures are rare. With larger headers, which are in common use today, vibrations in the drive may result in failures. The vibrations can cause premature failures of the wobble drive. They can also cause the drive belts and chains 104, 92 and 88 to flop up and down. Flopping of the chains and belts has resulted in shaft support bearing failures. There have also been cases of auger assembly 70 failures due to vibrations induced by the knife assembly.

A few years ago a bifilar-type centrifugal pendulum vibration absorber was mounted on a wobble drive input drive shaft 132. This prior art vibration absorber, as shown in FIGS. 2 and 3, solved problems related to torsional vibrations in the drive train. The prior art vibration absorber includes a mounting disk 168 secured to the input drive pulley 106 by bolts 170. The input drive pulley 106 is rigidly secured to the input drive shaft 132 by a nut 172. Four sets of two plate apertures 174 are provided in the outer portion of the mounting disk 168. A U-shaped weight 176 has its open portion positioned over the edge of the mounting disk 168 adjacent to each set of two plate apertures 174. Weight apertures 178 are provided in the legs of the U-shaped weight 176. The weight apertures 178 are the same diameter as the plate apertures 174 and can be alligned with a set of two plate apertures 174. A pin 180 passes through each plate aperture 174 and the two aligned weight apertures 178. Each U-shaped weight 176 is thus attached to the mounting disk 168 by two pins 180. As shown in FIGS. 2 and 3, a total of four U-shaped weights 176 are attached to the mounting disk 168.

The pins 180 are held in position by retainer plates 182 fastened to the sides of the U-shaped weights 176 by bolts 184.

The pins 180 have a diameter which is about half the diameter of the plate apertures 174 and the weight apertures 178. The U-shaped weights 176 and the pins 180 are thus able to move relative to the mounting disk 168 much like a pendulum to absorb torsional vibrations.

The pins 180 and other parts of the prior art vibration absorber as shown in FIGS. 2 and 3 are subject to wear. During severe knife loading which can bring the input drive shaft 132 to an abrupt stop, the U-shaped weights 176 bounce around and can damage vibration absorber components.

A centrifugal pendulum vibration absorber 186, as shown in FIGS. 4 and 5, eliminates many of the problems with the bifilar-type centrifugal pendulum vibration absorber, shown in FIGS. 2 and 3. At the same time, the vibration absorber 186 provides adequate vibration absorption.

The centrifugal pendulum vibration absorber 186 includes a flywheel 188 secured to the input drive shaft 132 by a nut 172. A V-belt groove 190 is shown on one side of the flywheel 188. If desired, a separate pulley could be provided. As shown in FIG. 5, four cylindrical apertures 192 are provided in the flywheel 188. The axis of each of the apertures 192 is parallel to the axis of rotation of the flywheel 188. A roller 194 is inserted in each aperture 192. Each roller 194 has a diameter somewhat less than the diameter of the aperture 192. This allows the rollers 194 to roll along the walls of the apertures 192 in response to changes in the speed of rotation of the flywheel 188 and absorb torsional vibrations.

A flat toroidal retainer 196 is secured to one side of the flywheel 188 by bolts 198. The toroidal retainer 196 holds the rollers 194 in the apertures 192. The toroidal retainer 196 leaves the radially outer portions and inner portions of the apertures 192 uncovered. Tnis allows any foreign material such as dirt to fall from the apertures 192. This ensures that the rollers 194 are free to roll along the surface of the aperture walls. The toroidal retainer 196 can be easily removed to replace the rollers 194 if replacement becomes necessary or desirable.

The number of apertures 192 can be increased or decreased as desired to change the amount of vibration absorption available. Vibration absorption can also be varied by changing the distance from the axis of rotation of the input drive shaft 132 to the axis of the apertures 192, by changing the length of the rollers 194 and by changing the diameter of the rollers 194 and the apertures 192. The length of the rollers 194 should be substantially the same as the depth of the apertures 192.

A modified form of the centrifugal pendulum vibration absorber is shown in FIG. 6. In this version, the diameter of the apertures 192 has been increased to the point that they overlap. This results in one large aperture in the flywheel 188 with a series of joined arcuate surfaces 200 in the radially outer wall. A large roller 194 is provided to roll along each surface 200 and absorb torsional vibrations. The large diameter rollers 194 that can be used in combination with each surface 200 can absorb substantial energy. Total energy absorption capability of the centrifugal pendulum vibration absorber 186 shown in FIG. 6 is greater than that of the version shown in FIG. 5 for units of the same overall dimensions. The version shown in FIG. 6 is, therefore, the preferred version if maximum vibration absorption is needed.

I claim:

1. A knife drive centrifugal pendulum vibration absorber including a knife support, a knife reciprocably supported on the knife support, a wobble drive mounted on one end of the knife support, the wobble drive including a rotatable input drive shaft and an oscillating output shaft, a knife drive arm rigidly secured to the wobble drive output shaft and pivotally secured to one end of the knife, a flywheel rigidly secured to the wobble drive input shaft, the flywheel having at least one aperture with an arcuate surface, a roller member in the aperture and free to roll along the arcuate surface in response to changes in the rotational speed of the input shaft of the wobble drive, and retainer means to hold the roller member in the aperture.

2. The knife drive centrifugal pendulum vibration absorber of claim 1 including a plurality of arcuate surfaces on the flywheel and a roller member associated with each arcuate surface.

3. The knife drive centrifugal pendulum vibration absorber of claim 1 wherein the arcuate surface is an arc about a centerline parallel to and spaced from the axis of rotation of the wobble drive input shaft.

4. The knife drive centrifugal pendulum vibration absorber of claim 3 including a plurality of arcuate surfaces on the flywheel and a plurality of roller members associated with the arcuate surfaces.

5. The knife drive centrifugal pendulum vibration absorber of claim 3 wherein the radius of the arc about the centerline is less than one-half the radius of the flywheel.

6. The knife drive centrifugal pendulum vibration absorber of claim 1 including an input drive pulley mounted on the input drive shaft.

7. The knife drive centrifugal pendulum vibration absorber of claim 6 wherein the input drive pulley is part of the flywheel.

* * * * *